C. WHEELER, Jr.
Harvester-Dropper.
No. 159,875.  Patented Feb. 16, 1875.
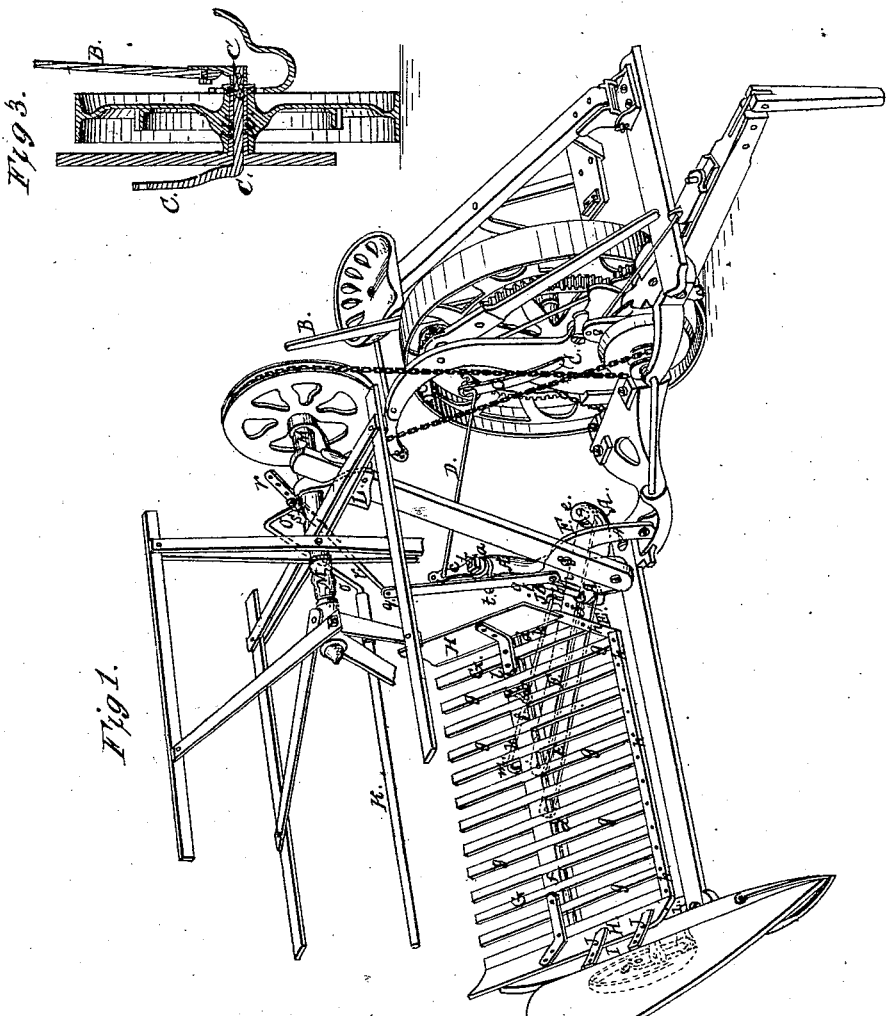
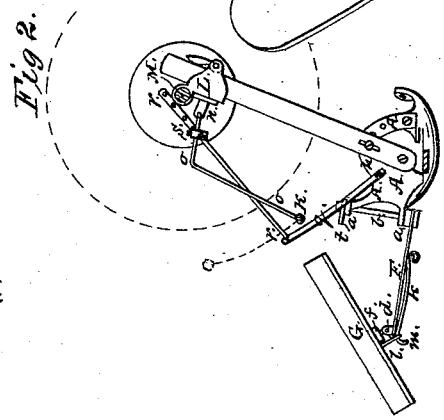

UNITED STATES PATENT OFFICE.

CYRENUS WHEELER, JR., OF AUBURN, NEW YORK.

IMPROVEMENT IN HARVESTER-DROPPERS.

Specification forming part of Letters Patent No. 159,875, dated February 16, 1875; application filed May 3, 1869.

*To all whom it may concern:*

Be it known that I, CYRENUS WHEELER, Jr., of Auburn, in the county of Cayuga and State of New York, have invented a new and useful Improvement in Droppers for Harvesting-Machines; and I do hereby declare the following to be a full, clear, and exact description of the construction and operation of the same, reference being had to the accompanying drawings, making a part of this specification, in which—

Figure 1 represents a perspective view of the dropper as attached to a harvesting-machine. Figs. 2 and 3 represent detached portions of the apparatus not definitely seen in Fig. 1.

Similar letters of reference, where they occur in the separate figures, denote like parts in all of the drawings.

My invention consists in combining, with one of the parallel bars and the dropper, a traveling link and stop, or their equivalents, for tipping or dumping the dropper after it has arrived at the place where the grain is to be deposited on the ground.

My invention further consists in combining, with a swinging and hinged dropper, a bench, ledge, or support under its outer end, to hold it from tipping forward while receiving its charge.

My invention further consists in operating a hinged swinging and dumping dropper by a lever in close proximity to the driver in his seat, so that a backward and forward motion of said lever will cause the dropper to perform its four motions—viz., rearward, dumping, righting-up, and forward motions.

To enable others skilled in the art to make and use my invention, I will proceed to describe the same with reference to the drawings.

The machine herein represented, to which the dropper is applied, is substantially the same as that shown in patents heretofore granted to me, and the application of the dropper to this special machine is a mere matter of convenience, as it can be applied to any of the modern styles of harvesting-machines in common use, and I so mean to apply it. A description of the machine herein shown is not deemed necessary, it being shown in the drawings.

In a plate or cast piece, A, which is secured to the main frame of the machine, or a projection therefrom, and in supports $a\ a$ on or in said casting A, there is placed a turning shaft or stud, $b$, which can be operated by a lever, B, in close proximity to the driver's seat, through the bent arm, C, link D, and lever-arm $c$ on said stud, post, or shaft $b$. To the lower end of the shaft, post, or stud $b$ there is secured, so as to turn with it, a bar or arm, E, the extreme outer end of which is pivoted to a bar, $d$, and upon a projecting portion, $e$, of the casting or plate A there is pivoted a second bar or arm, F, the outer end of which is also pivoted to the bar $d$, so that these two bars E F are parallel to each other and move together, one by the positive motion of the lever or turning-post $b$, and the other passively, as it is connected to the same bar $d$ that the other active bar or arm E is pivoted to, and must move with said bar $d$. To the bar $d$, which is supported on and carried by the parallel bars E F, is pivoted the dropper G, through its sill or bed-piece $f$, as seen more distinctly in Fig. 2, so that the dropper may turn on said pivots to dump its load, and then right up again. The dropper G, to be light and strong, is composed of a series of slats, $g$, fastened to the sill or bed-piece $f$. The rear ends of the slats are open and free, and their front ends are clasped or caught by a piece or strip of thin metal, $h$. The sides of the dropper, as at H H, are raised, so as to hold the grain and form a cradle to carry the cut grain in. The strip, sill, or bed-piece $f$ is somewhat behind the center of the dropper, so that it will have no tendency to dump its load until at the proper time and by the proper means, as the preponderance of weight is at the front of the dropper. On the outside dividing-board I there are two guides or guards, J J, extending downward and off from the board I, so that the raised side H of the dropper may swing under said pieces J J, and then they become guides to direct the grain that falls against them onto the dropper G. Below the dividing-board I there is a ledge or projection, i, upon which the dropper can rest while in the position for receiving its load or charge.

Upon the bar F of the pair of parallel bars there is an arm, j, to which is linked a rod, k, said rod passing through a down-hanger, l, fastened to the dropper G, and the outer end of said rod k is bent, as at m, so that it cannot pass through the eye in the down-hanger, but catch against and hold onto it. When the dropper is receiving a charge or load of grain behind the cutters the hook m of the rod k projects far beyond the down-hanger l; but as the dropper swings around to the position where it is to dump its load the rod k slips in or through the down-hanger until its hook catches and holds in or against the down-hanger. The dropper continuing its motion and the rod holding onto the down-hanger, it draws the dropper down at its rear or dumps it, causing it to discharge its load behind the main frame and out of the path of the machine on its next round, and with the stalks parallel with the forward motion of the machine.

It will be noted as one of the peculiar characteristics of this mode of operation of the dropper that it receives the stalks just as they are received on any grain-table under the operation of a reel and cutting apparatus, and that then the dropper carries that grain around rearward and back of the main frame, swinging about a fixed center, and yet it drops the stalks upon the ground in the same direction of heads and butts as they were in when received upon the dropper, and in parallel planes thereto; or, in other words, the dropper swings around a center of motion without changing the direction of the stalks lying upon it.

A dividing-rod, K, acts in connection with the dropper to hold the grain that falls while the dropper is carrying its load around to deposit it and return for the succeeding load or charge.

The dividing-rod is operated as follows: A long bent shank, o, connects the dividing-rod to the bearer or support, n, upon the saddle L, that supports the reel-shaft M; and to the plate A, at a point, p, thereon, is pivoted a bar, q, to the upper end of which is connected one end of a link, r, the other end of which is connected adjustably to an adjustable head, s, on the bent shank o of the dividing-rod K. On the turning stud or post b there is an arm, t, which, as the dropper is swung into its position for receiving a charge of cut grain, comes against the pivoted bar q, and, moving said bar toward the front of the machine, causes, through the connections above mentioned, the dividing-rod to be raised up out of the way of the falling grain. When the dropper has received its charge and is swung around to deliver it the arm t leaves the bar q, and there being nothing to longer hold up the dividing-rod it falls by its own gravity, and catches and holds the falling grain until the dropper is returned to its receiving position, when the dividing-rod is again swung up out of the way, and in so doing delivers the grain it has been catching and holding upon the dropper.

As a convenient way of connecting the lever B on one side of the main drive-wheel with the lever-arm C on the other side thereof, and without going around the wheel to do so, I pass the crank or bent arm C through the journal u of said wheel, which is made hollow or in the form of a sleeve or boss for that purpose, as seen in Fig. 3.

When the dropper is applied to two-wheeled machines the connections between the main lever B and the turning-post b may be differently arranged, and go around instead of through the wheel bearing or shaft. So, too, it may be arranged on a one-wheel machine, if preferred.

Having thus fully described my invention, what I claim therein as new, and desire to secure by Letters Patent, is—

1. In combination with one of the pair of moving parallel bars and the dropper, a sliding or moving link and stop, or their mechanical equivalents, for tipping or dumping the dropper when it has arrived at the place where the grain is to be deposited, substantially as described.

2. In combination with a swinging and hinged dropper, a bench, ledge, or support under its outer end, to prevent it from tipping forward while receiving its charge, substantially as described.

3. In combination with the hinged swinging and dumping dropper G, that carries around and delivers the grain in rear of the machine, as described, the single lever B, in close proximity to the driver's seat, which lever, by two motions—viz., a backward and forward one—through the herein-described connections, will impart to the dropper four motions—viz., a rearward, a dumping, a righting-up, and a forward one—substantially as and for the purpose described.

C. WHEELER, Jr.

Witnesses:
CHAS. A. MYERS,
WM. S. EVERTS.